W. B. WESCOTT.
CINEMATOGRAPHIC MULTIPLEX PRINTING.
APPLICATION FILED FEB. 28, 1917.
1,409,628.
Patented Mar. 14, 1922.
3 SHEETS—SHEET 3.
Fig. 3.
Fig. 5.
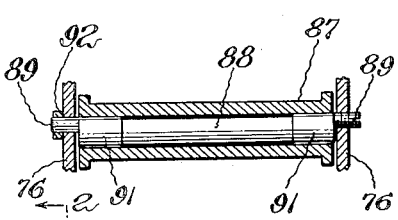
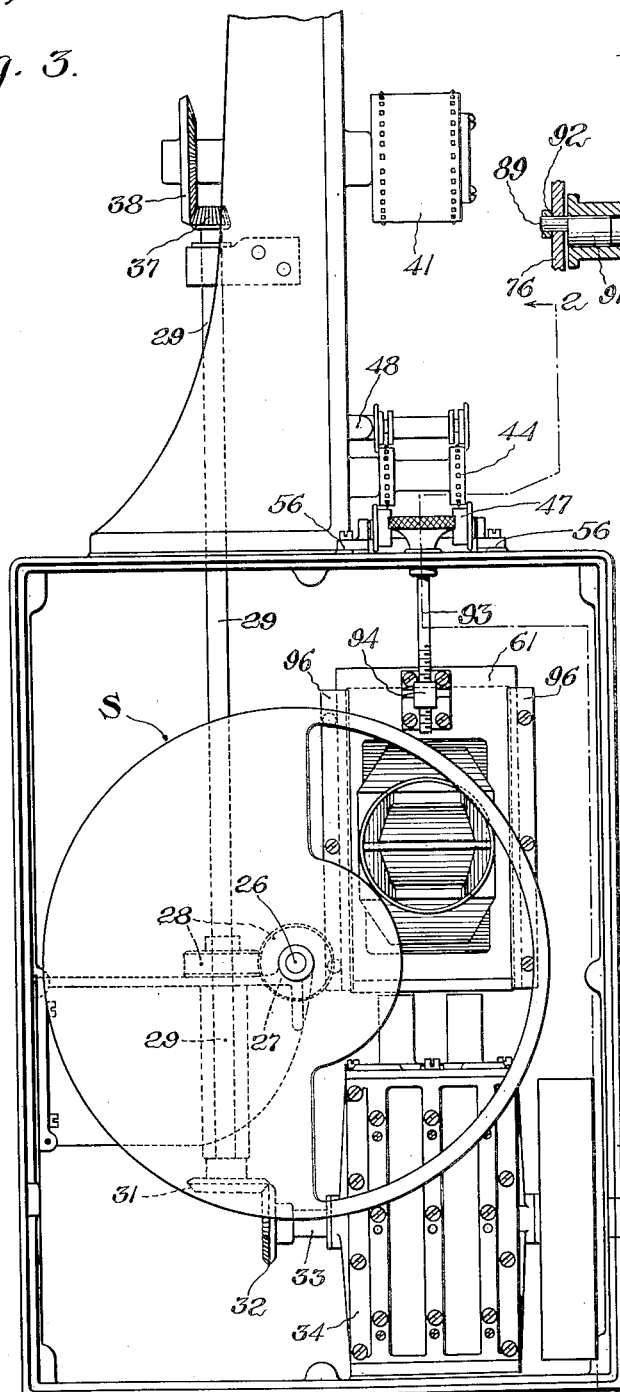
Inventor:
William B. Wescott,
by Roberts Roberts & Cushman
Attorneys.

UNITED STATES PATENT OFFICE.

WILLIAM BURTON WESCOTT, OF WELLESLEY HILLS, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

CINEMATOGRAPHIC MULTIPLEX PRINTING.

1,409,628.   Specification of Letters Patent.   Patented Mar. 14, 1922.

Application filed February 28, 1917. Serial No. 151,455.

*To all whom it may concern:*

Be it known that I, WILLIAM BURTON WESCOTT, a citizen of the United States, and resident of Wellesley Hills, in the county of Norfolk and State of Massachusetts, have invented new and useful Improvements in Cinematographic Multiplex Printing, of which the following is a specification.

This invention relates to cinematography, and more particularly to color cinematography of the additive type wherein a multiplex film having a plurality of series of images is employed, the images of the respective series being complemental, that is, representing two or more color aspects of the object field and, when projected upon a screen in superposition, being adapted to reproduce the object field in colors which are at least approximately natural. The invention has been illustrated as being embodied in cinematographic printing apparatus, but many phases of the invention are also applicable to other cinematographic apparatus, for example, projection apparatus.

In printing positives from negatives, or vice versa, where the images are juxtaposed on integral films as on multiplex picture films for use in color motion picture projection, any one of several considerations may make it desirable to print each of the complemental series of pictures, corresponding to a particular component color, with a separate beam of light. For example, the series of pictures are ordinarily exposed through different color screens or light filters and in the event that the filters do not have the proper relative powers the series of negatives will not, relatively, be of the proper average opacity. Thus it may be desirable to balance the relative opacities of the positives in the printing process by employing, with the respective series of pictures, light of different degrees of intensity, whereby the respective series of positives will have the proper relative opacities, and to do this it is necessary separately to control the light employed for printing each series of pictures.

Furthermore, it has been found that components of light of different colors affect the ordinary photographic emulsion to slightly different degrees resulting in images having different contrast gradients, the images formed with components of light of greater wave length having the greater contrast. This effect is similar to that produced by developing the respective images different amounts and could be compensated for in the development by developing the respective images different amounts. However, where the respective series of images are juxtaposed on an integral film it is practically impossible to develop each series separately and it is therefore desirable to correct for the contrast phenomenon in some other way.

As disclosed in the application of Daniel F. Comstock, Sr. No. 112,375, filed July 31, 1916, a simple method of correcting for the different contrast gradients comprises the utilization of the same phenomenon which caused the difference, namely, the utilization of components of light having different colors or dominant hues in printing the respective series of positives. For example, if the respective series of negatives be exposed through red and green color screens the series exposed with red light may be printed with green light and the series exposed with green light may be printed with red light, whereby the difference in contrast gradients in the negatives is eliminated in the positives. However, any pair of light components having a suitable difference in dominant hue may be employed, and preferably components having actinic power greater than red and green light, such as blue and ultra-violet light. Pictures projected upon a screen in superposed relation from such positives do not appear too green in the shadows nor too red in the high lights, but have accurate color values throughout the entire range of lights and shadows.

Furthermore, when employing a film of standard width as a multiplex film for color projection, it is preferable, for many reasons, to space apart the corresponding pictures of the respective series by at least one picture space. In two-color projection the corresponding pictures are preferably spaced apart with two intervening picture spaces and the film is advanced two picture spaces at a time so that all the picture spaces are utilized. For three-color projection the corresponding pictures are preferably spaced apart with single intervening picture spaces and the film is advanced three picture spaces at a time so that all the picture spaces are utilized. And inasmuch as the ordinary commercial film is affected by heat and atmospheric conditions it expands and contracts under varying conditions. This affects the longitudinal distance between pictures and where the corresponding pictures of a multiplex film are spaced apart this variation is material. Moreover, the distance between the successive pictures depends upon and varies with the different cameras employed in making the exposures. It is therefore desirable to provide means to adjust the effective distance between the picture apertures in the printing apparatus where a plurality of apertures are employed simultaneously.

The object of my invention, therefore, is to provide a method and means for simultaneously producing a plurality of pictures through separate film gate apertures, for simultaneously producing a plurality of pictures with beams of light of different colors, for jointly controlling the intensity of the beams of light, for relatively adjusting either the intensity or color of the respective beams of light, for advancing the picture strips a plurality of picture spaces at a time, for varying the effective distance between the respective picture apertures, for varying the effective distance between the picture apertures and the film advancing means, and for maintaining the positive and negative picture strips in intimate contact at the printing apertures. Obviously these functions may be employed jointly or severally and my invention is not limited to the whole or any particular group of these means in combination except as expressly set forth in the claims annexed hereto.

Other objects of the invention will be apparent from the following description read in connection with the accompanying drawings, in which Figure 1 is a front elevation of the apparatus, parts being broken away;

Figure 3 is a rear elevation of the apparatus with the rear wall of the casing and mechanism carried thereby removed;

Figure 4 is a vertical longitudinal section through the film gate on line 4—4 of Fig. 1, parts being omitted; and Figure 5 is a longitudinal section through the eccentric roller employed for controlling the effective distance between the image apertures in the film gate.

Figure 1:
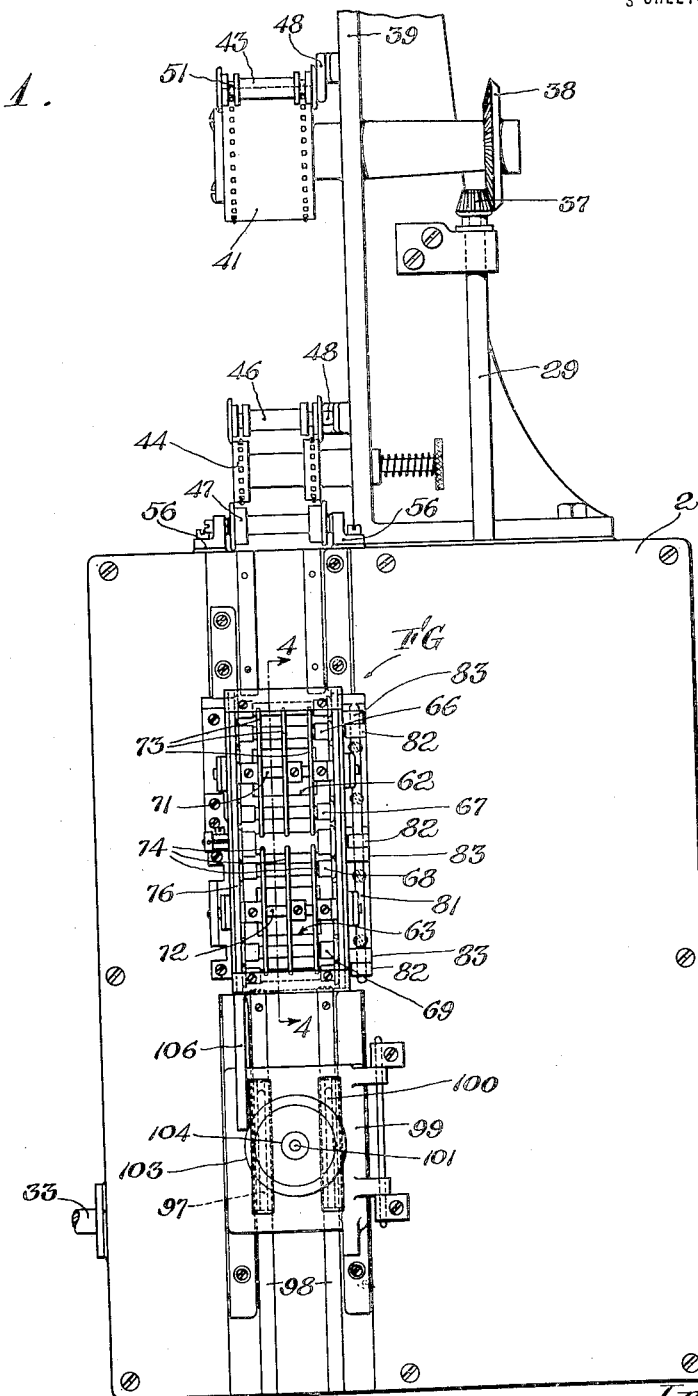

The apparatus in which my invention is herein illustrated comprises a housing 1 having film gate mechanism FG mounted in its forward side 2 and having on its rear wall 3 a lamp housing 4 containing sources of illumination 6 and 7. Extending between the lamp casing 4 and the film gate FG is preferably provided a casing 8 comprising two compartments 9 and 11 separated by the partition 12 so that light from the lamp 6 passes through compartment 9 to the upper aperture of the film gate and so that light from the lower lamp 7 passes through compartment 11 to the lower aperture of the film gate. The inner walls of these compartments are preferably painted dead black so that no light will be reflected from the walls to the film gate apertures and so that only light emanating directly from the light sources will pass to the film gate apertures; otherwise some light might be reflected from the walls of the compartments in such manner as to render the intensity of the respective beams of light irregular throughout the film gate apertures.

The particular structure of the lamp housing 4 may be considerably varied within the scope of my invention, but in the particular structure herein illustrated the housing comprises a vertical portion 13 having an aperture 14 in its forward side and having a partition 16 extending horizontally through the central portion of the housing between the two light sources. Surrounding the opening 14 and extending forwardly from the housing 4 is a flange 17 arranged to fit over a flange 18 extending rearwardly from the rear wall 3 of the housing 1. The partition 16 is arranged to extend into the extension 18 on the rear wall 3 and preferably to extend slightly within the housing into close proximity with the shutter S, later to be described. The light sources are preferably mounted in caps 21 and 22, respectively, which are shaped to fit over the ends of the vertical portion 13 of the housing 4. In one side of the extension 18 are provided slots 23 and 24 to permit color screens GS and RS to be inserted into the extension 18 in the paths of the respective beams of light. And, if desired, the inner surfaces of the member 18 and the upper and lower surfaces of member 16 may be provided with grooves or channels in alinement with the slots 23 and 24 to serve as guideways for the respective screens.

The mechanism for cutting off the passage of light from the lamp housing 4 to the film gate apertures comprises a shutter S rotatably mounted between the forward end of the partition 16 and the rear end of compartments 9 and 11 within the housing 1. The shutter is mounted on shaft 26 which rotates in bearing 27 and which is driven by a set of gears 28 connecting the shaft 26 with the vertical shaft 29. The vertical shaft 29 is provided at its lower end with a bevel gear 31 which meshes with a bevel gear 32 mounted on the shaft 33, the shaft 33 extending through the casing 34 to the outside of the main housing 1 to a handle or to a suitable source of mechanical power for driving the apparatus.

At its upper end the shaft 29 extends through a bearing 36 in the top of the casing 1 and carries on its extreme upper end a bevel gear 37 meshing with a bevel gear 38, the gear 38 being mounted on one end of a shaft which extends through the upwardly extending member 39 and which carries on its other end a sprocket wheel 41 arranged to advance the films from film reels there-above (not shown) to the film-gate. As indicated by the line F the films pass over the sprocket wheel 41, being held in contact therewith by means of a roller 43, thence downwardly over sprocket wheel 44, the film being held in engagement with this sprocket wheel by means of a roller 46, and thence over rollers 47 to the film-gate.

Figure 2:
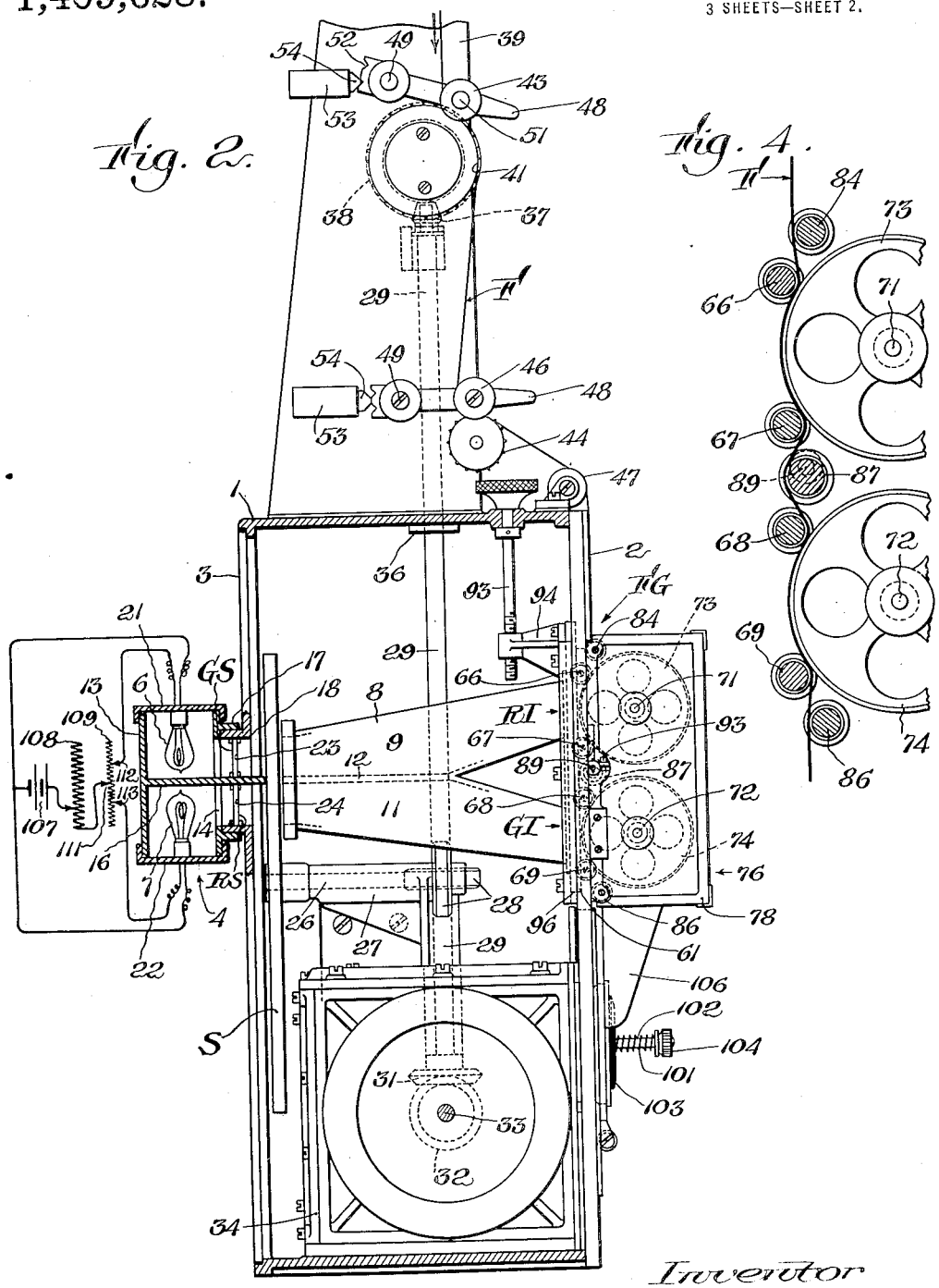
Figure 2 is a vertical longitudinal section of the apparatus taken on line 2—2 of Fig. 3.

The mechanism for holding the film in engagement with each of the sprocket wheels comprises a member 48 pivotally mounted at 49 on a shaft mounted in the extension member 39 and, at the forward end of member 48, a shaft 51 carrying the roller 43, the roller having outer flanges and having grooves registering with the teeth on the sprocket wheel, as shown in Figs. 1 and 3. In order to hold the rollers 43 in engagement with the periphery of the sprocket wheels, the rear ends of the members 48 are provided with notches 52 and in proximity to the ends of the members 48 is mounted a tubular member 53 containing a plunger 54 yieldingly urged forwardly by means of a spring not shown. The end of each plunger 54 is so disposed with respect to the corresponding member 48 that when the member 48 is depressed into the position shown in Fig. 2 with the roller 43 engaging the periphery of the sprocket wheel, the plunger 54 is advanced by the spring so that its wedge-shaped forward end extends into the lower notch 52 and yieldingly holds the gate mechanism 43—48 in operative position with respect to the sprocket wheel. When the mechanism is disengaged from the sprocket wheel by rotating the arm 48 in a counter-clockwise direction about the shaft 49, the plunger is forced rearwardly against the action of the spring and when the member 48 has been raised a predetermined amount the plungers are advanced into the upper notches 52, thereby yieldingly to maintain the arms 48 in the inoperative raised position.

The roller 47 is mounted on the top of the casing 1 in bearings 56 and the bearings are preferably so disposed that the roller 47 projects slightly in advance of the forward face of the casing 1, so that the films in passing from the roller 47 to the film-gate do not engage the forward face of the housing 1.

The film-gate mechanism comprises a plate 61 mounted in the forward wall 2 of the housing 1 and having therein two apertures 62 and 63 (Fig. 1) in alinement with the compartments 9 and 11. Immediately above and below each of the apertures 62 and 63 are provided rollers 66, 67, 68 and 69, these rollers being mounted on the forward face of the film-gate. The forward face of the film-gate immediately surrounding each of the apertures 62 and 63, is curved inwardly about a horizontal axis substantially coincident with the axes of the shafts 71 and 72 and upon the shafts 71 and 72 are mounted respectively a plurality of disks 73 and 74, these disks having such diameters that they extend into close proximity with the concave portions of the film-gates immediately surrounding the film-gate apertures between the sets of rollers 66—67 and 68—69, respectively. The shafts 71 and 72 are mounted at opposite ends in suitable bearings in the rectangular housing 76.

The housing 76 consists of sheet metal or other opaque end, top and bottom members held together by means of a frame 78 surrounding the edges of the said members. The forward side of the casing 76 may either be left open as shown in Fig. 1 or a plate of red glass may be provided to cover this side so that the inside of the casing may be viewed to determine when the lights are turned on, when the mechanism is working properly, etc. The casing 76 is pivotally mounted on the forward face of the film-gate upon a vertical shaft 81 which extends through lugs 82 extending forwardly from the film-gate and through lugs 82 extending laterally from one side of the casing 76 in proximity to the forward face of the film-gate.

At the forward upper and lower corners of the casing 76 are mounted rollers 84 and 86, respectively, these rollers being rotatably mounted in the sides of the casing 76 as are the shafts 71 and 72. The rollers 84 and 86 are disposed in substantial parallelism with the rollers 66 to 69 and they are so positioned in the casing 76 that when the casing is swung into operative relationship with the film gate, as illustrated in the drawings, the rear of the rollers 84 and 86 are disposed either substantially in the vertical plane of the forward sides of the rollers 66 to 69 or slightly in the rear of this plane. Furthermore, when the casing 76 is swung into this operative position the disks 73 and 74 extend into close proximity with the concave portions of the film gate leaving only sufficient room for the plurality of films to pass between the disks and the film-gate.

Another roller 87 is rotatably mounted in the casing 76, this roller being disposed between the two sets of disks 73 and 74, and when the casing 76 is swung into closed position, the forward edge of this roller also extends to or beyond the plane of the forward sides of the rollers 66 to 69. Instead of being mounted in any suitable type of bearings as are rollers 66 to 69, etc., the roller 87 is mounted on an eccentric bearing as more clearly illustrated in Fig. 5. The eccentric bearing comprises a shaft 88 mounted eccentrically in the casing 76 by means of projections 89 disposed off-center on the opposite ends of the shaft and extending outwardly through suitable openings in the casing 76. The shaft 88 is provided near its opposite ends with enlarged portions 91 around which the roller 87 fits in such manner as smoothly to rotate thereon. The right hand projection 89 on the shaft 88 is screw-threaded and is provided on its outer end with a slot so that it can be rotated by means of a screw-driver. As it is rotated the shaft 88 is moved along its axis slightly but this is merely incidental, the object of the screw threads being to permit the shaft 88 to be rotated and to hold it in any adjusted position. In order more securely to maintain the shaft 88 in adjusted position, a split collar 92 may be provided on the outside of the casing 76, this collar being rigidly attached to the casing and being adapted to grip the end of the projection 89 a suitable amount determined by the set screw 93.

The film-gate 61 is arranged to be bodily reciprocated in a vertical direction by means of a screw 93 (Fig. 2) mounted in a suitable bearing in the top of the casing 1 and its lower end being threaded into a projection 94 mounted on the rear face of the film gate. Guides 96 are mounted on the rear face of the forward wall 2 of the casing 1 on either side of the film-gate 61 so as accurately to guide the upward and downward movement of the film-gate and accurately to maintain the film-gate in alinement with the feeding mechanism above and below the film-gate. Inasmuch as the casing 76 containing disks 73 and 74, etc., is mounted on the forward face of the film gate and not on the forward wall 2 of the casing 1, the casing 76 and mechanism contained therein moves along with the film-gate.

The means for advancing the films through the film-gate preferably comprises cam mechanism contained within the casing 34 and driven by shaft 33. Inasmuch as this mechanism is described and claimed in applicant's former application Sr. No. 119,377, filed Sept. 11, 1916, reference is hereby made to the former application for a description of this apparatus. For the purpose of this application, it is sufficient to recite that the cam mechanism within casing 34 causes pins to reciprocate through and along slots 97 in the forward wall of the housing 1 in such manner as to engage the marginal openings in the films and intermittently advance the films. In order to maintain the films against the guides 98 in operative relation to the slots 97, an auxiliary film-gate cover 99 is pivotally mounted below the main film-gate. This auxiliary film-gate cover is provided with two slots in registry with the guides 98 on the film-gate and within these slots are flat runners yieldingly urged through the slots toward the guides 78 by means of spring 101 surrounding the pin 102 and extending between the disk 103 and the knurled head 104. The pin 102 is rigidly mounted in the central portion of the gate 99 and by threading the knurled head 104 along the pin 102 the pressure of the runners 100 against the films may be controlled. The auxiliary film-gate cover 99 is closed and maintained in closed position by means of a member 106 extending downwardly from the bottom of casing 76 and engaging the outer face of the auxiliary film-gate cover. The cam mechanism within casing 34 is so designed as intermittently to advance the film a plurality of picture spaces at a time. With two-color multiplex films of the character above referred to, the films are advanced two picture spaces at a time, whereas in three-color films the films are advanced three picture spaces at a time.

My improved means for controlling the intensities of the light sources comprises a source of current 107 connected at one side to one terminal of each of the lamps and at the other side connected to the other terminal of the respective lamps through the adjustable resistances 108 and 109. The adjustable resistance 108, as illustrated, is connected in series with both lamps, whereas the resistance 109 is connected in parallel with the respective lamps, a portion of the current flowing in each direction from the adjustable contact point 111 through contact points 112 and 113 to the respective lamps.

The operation of the apparatus is as follows: The casing 76 is swung away from the film-gate so that the two films, namely, the image-bearing film whether positive or negative and the film to be printed therefrom, may be inserted between the film-gate and the mechanism contained in casing 76 and also between the lower film-feeding mechanism and the auxiliary film-gate cover 99, the image-bearing film being placed on the inside with its image-bearing surface facing outwardly and the film to be printed being placed with its sensitized surface facing inwardly in contact with the image-bearing surface of the image-bearing film. The casing 76 and auxiliary film-gate cover 99 are then swung into closed position and after the films have been placed between the sprocket wheels 41 and 44 and the guides 43 and 46, the feed mechanism may be started, thereby feeding the films downwardly from the feed reels above the apparatus to the take-up reels below the apparatus, the course of the films through the apparatus being indicated by line F in Figs. 2 and 4. By virtue of the disks 73 and 74 engaging the outer face of the outer film, the two films are maintained in intimate contact at the film-gate apertures, ensuring a clear and accurate reproduction of the images. Inasmuch as the disks 73 and 74 are rotatably mounted on shafts 71 and 72, they are rotated by the passage of films therealong, thus eliminating a sliding contact between the film and the disks, and the disks are preferably made of such material that they do not make any impression upon the film.

As previously stated, the pairs of complemental images are preferably spaced apart by two intervening picture spaces and in order properly to position the pairs of images before the film-gate apertures 62 and 63, it is necessary vertically to adjust the film-gate with respect to the film-feeding mechanism and this is accomplished by means of the shaft 93. It is also desirable to vary the effective distance between the two film-gate apertures so that when one image of a pair of complemental images is presented to one film-gate aperture the other image of the pair will be accurately registered with the other film-gate aperture. This is accomplished in my invention by means of the eccentrically mounted roller 87. As illustrated in Fig. 4 the path of the film between the rollers 67 and 68 can be varied in length by rotating the roller 87 about its eccentric axis 89. Obviously, the effective distance between the two film-gate apertures might also be controlled by bodily shifting the upper and lower portions of the film-gate with relation to each other, but the eccentric roller affords a much more simple and effective means of controlling this effective distance. In three-color printing there would obviously be three film-gate apertures and an eccentric roller would be provided both between the upper and middle apertures and between the middle and lower apertures.

In order to control the intensity of the light sources without varying their relative intensity, the adjustable resistance 108 may be employed as, for example, to adjust the light sources to the approximate intensity to give approximately the desired average opacity of the printed film; and, in order to control the relative intensity of the light sources, the contact 111 may be shifted along the resistance 109 thereby decreasing the current through one lamp as the current through the other lamp is increased. For most purposes, these two adjustments will suffice, but if desired two additional contact points 112 and 113 may be arranged to be moved along the resistance 109 each of these adjustments controlling only a single lamp. When the contact points 112 and 113 are not made adjustable, the leads to which they are connected are preferably connected to the ends of the resistance 109, in which event all of the resistance 109 is employed at all times.

One advantage of using a rheostat having its opposite ends connected to the respective light sources and having a contact such as 111 adjustable therealong, is that a single rheostat serves for both light sources. Another advantage is that a single adjustable contact is employed to vary the resistance in both circuits and when the resistance of this contact point varies, as it inevitably does in practice due to atmospheric conditions and other causes, the relative intensity of the light sources is unaffected. By varying the relative intensity of the two lights, the relative average density of the respective series of complemental images may be varied thereby to compensate for incorrect relative exposure or to control the desired relative intensity of the two series of printed images for any desired purpose.

In accordance with the invention disclosed in application Sr. No. 112,378, above referred to, the images corresponding to the red and green aspects of the object field, for example, are printed with green and red light, respectively, or with components of light of higher actinic values but of suitably different hues. Therefore, with green light passing to the upper film gate aperture from the green color-screen GS and with red light passing to the lower film-gate aperture from red color-screen RS, the image-bearing films would be advanced through the film-gate in such manner that the images formed with red and green light, respectively, directly from the object field, for example, would be presented to the lower and upper apertures, respectively. Thus, positives printed from negatives exposed with red light would be printed with green or ultra-violet light, for example, and positives printed from negatives exposed with green light would be printed with red or blue light, depending upon whether green or ultra-violet light is employed in printing the complemental positives. And, in order to control the relative hues of the light projected to the respective film-gate apertures, the color screens GS and RS may be changed as desired.

Many of the features herein described in combination with printing apparatus are also applicable to other cinematographic apparatus such as camera and projectors; for example, the means for controlling the effective distance between the apertures may be employed to advantage in camera and projection apparatus. Likewise the method and means for controlling the light values of the beams passing through the respective apertures may be used in projection apparatus to control the brilliancy and relative color values of the screen pictures.

I claim:

1. Cinematographic apparatus for printing multiplex motion picture films having a series of sets of complemental images, the respective images of each set representing different color aspects, comprising means having a plurality of picture apertures, one aperture for each color aspect, means for intermittently advancing negative and positive films past said apertures to present successive images representing one color aspect to one aperture and successive images representing another aspect to another aperture, whereby the images of each aspect are printed separately through separate apertures in a single passage of the films through the printer.

2. Cinematographic apparatus comprising means having a plurality of picture apertures, means for intermittently advancing negative and positive films past the apertures, and means for simultaneously printing a plurality of pictures by projecting light through the apertures, and means for maintaining the films in contact throughout the space between the apertures whereby the images are spaced on the positive in the same way as on the negative.

3. Cinematographic apparatus comprising means having a plurality of picture apertures, means for intermittently advancing negative and positive films past the apertures a plurality of picture spaces at a time, and means for simultaneously printing a plurality of images from one film upon the other film by projecting light through the apertures, said advancing means being arranged to move the films along equal paths between the apertures whereby the images are spaced on the positive in the same way as on the negative.

4. Cinematographic apparatus comprising means having a plurality of picture apertures spaced apart an effective distance equal to the length of a plurality of picture spaces, means for advancing negative and positive films past the apertures along substantially the same path, and means for simultaneously printing a plurality of images upon one film from the other film by projecting light through the apertures.

5. Cinematographic apparatus comprising means having $n$ picture apertures spaced apart an effective distance equal to the length of $n$ picture spaces, means for intermittently advancing negative and positive films past the apertures $n$ picture spaces at a time, and means for simultaneously printing $n$ images from one film upon the other film by projecting light through the apertures.

6. Cinematographic apparatus comprising means having a plurality of picture apertures, means for supporting films in printing position with respect to the apertures, means including lighting means for printing a plurality of images from one film upon the other film by projecting light through the apertures, and means for varying the intensity of the light passing through one aperture without changing the intensity of the light passing through the other aperture.

7. Cinematographic apparatus comprising means having a plurality of picture apertures, means for supporting picture films with complemental images in printing position with respect to the apertures, means for printing a plurality of images from said images by projecting light through the apertures, and means for varying the intensity of the light passing through either aperture independently of the intensity of light passing through the other aperture.

8. Cinematographic apparatus comprising means having a plurality of picture apertures, means for advancing negative and positive films past the apertures, and means for projecting through the respective apertures components of light having different ranges of wave length, whereby corresponding pictures of a multiplex film may be printed with the different components of light, respectively.

9. Cinematographic apparatus comprising means having a plurality of picture apertures, means for advancing negative and positive films past the apertures, means for varying the effective distance between the respective apertures, and means for simultaneously printing a plurality of images from one film upon the other film by projecting light through the apertures.

10. Cinematographic apparatus comprising means having a plurality of picture apertures, means for advancing negative and positive films past the apertures, means for varying the effective distance without varying the actual distance between the respective apertures, and means for simultaneously printing a plurality of images from one film upon the other film by projecting light through the apertures.

11. Cinematographic apparatus comprising means having a plurality of picture apertures, means for advancing a film past the apertures, means for causing the film to follow a circuitous path between the apertures and maintaining the film substantially taut, means to vary the length of the path, and means for simultaneously projecting light through the apertures.

12. Cinematographic apparatus comprising means having a plurality of picture apertures, means for advancing a film past the aperture, adjustable eccentric means for causing the film to follow a circuitous path between the apertures whereby the effective distance between the apertures may be varied, and means for simultaneously projecting light through the apertures.

13. Cinematographic apparatus comprising means having a plurality of picture apertures spaced apart an effective distance equal to the length of a plurality of picture spaces, means for advancing a film past the apertures, a roller for causing the film to follow a circuitous path between the apertures, means adjustably supporting the roller whereby the effective distance between the apertures may be varied, and means for simultaneously projecting light through the apertures.

14. Cinematographic apparatus comprising means having picture apertures, means for intermittently advancing a film past the apertures recurrently to bring successive sets of images before the apertures, means for varying the effective distance between the apertures and the film advancing means, and means for projecting light through the apertures.

15. Cinematographic apparatus comprising film-gate means having picture apertures, means for intermittently advancing a film past the apertures, means for relatively moving the film-gate means and the film advancing means to vary the effective distance between the said means, and means for passing light through the apertures.

16. Cinematographic apparatus comprising means having picture apertures, means for advancing negative and positive films past the apertures, means behind each aperture to cause the films to bow forwardly and thereby maintain close contact with each other while passing the aperture, and means for projecting light through the apertures.

17. Cinematographic apparatus comprising means having picture apertures, means for advancing negative and positive films past the apertures, one or more rollers behind each aperture to bow the films forwardly through the aperture thereby maintaining close contact between the films while passing the aperture, and means for projecting light through the apertures.

18. Cinematographic apparatus comprising means having picture apertures, means for advancing films past the apertures, a plurality of disks rotatably mounted behind each aperture to bow the film forwardly through the aperture thereby maintaining close contact between the films while passing the aperture and means for projecting light through the apertures.

19. Cinematographic apparatus comprising means having a plurality of picture apertures, means for advancing multiplex film past said apertures so that complemental images are presented to the respective apertures concomitantly, means for projecting beams of light through the apertures respectively, and means for conjointly varying the respective beams of light so as to regulate the relative color values of the images.

20. Cinematographic apparatus comprising means having a plurality of picture apertures, means for advancing multiplex film past said apertures so that complemental images are presented to the respective apertures concomitantly, means for projecting beams of light through the apertures respectively, and means for varying the relative intensity without substantially varying the average intensity of said beams, thereby to regulate the relative color values of the images.

21. Cinematographic apparatus comprising means having a plurality of picture apertures, means for advancing multiplex film past said apertures so that complemental images are presented to the respective apertures concomitantly, a plurality of light sources associated with said apertures so as to project light through the respective complemental images, and means for conjointly varying the intensities of the respective light sources in opposite senses, thereby to regulate the relative color values of the images.

22. Cinematographic apparatus comprising means having a plurality of picture apertures, means for advancing multiplex film past said apertures so that complemental images are presented to the respective apertures concomitantly, a plurality of light sources associated with said apertures so as to project light through the respective complemental images, and means for varying the relative intensity without varying the average intensity of said light sources, thereby to regulate the relative color values of the images.

23. Cinematographic apparatus comprising means having a plurality of picture apertures, means for advancing multiplex films past said apertures so that complemental images are presented to the respective apertures concomitantly, means for projecting light through the apertures to print images from one film upon the other film, and means for relatively controlling the light projected through the respective apertures, thereby to control the relative color values of the printed complemental images.

24. Cinematographic apparatus comprising means having a plurality of picture apertures, means for advancing multiplex films past said apertures so that complemental images are presented to the respective apertures concomitantly, means for projecting light through the apertures to print images from one film upon the other film, and means for controlling the relative intensity of the light projected through the respective apertures, thereby to control the relative opacities of the printed complemental images.

25. Cinematographic apparatus comprising means having a plurality of picture apertures, means for advancing multiplex films past said apertures so that complemental images are presented to the respective apertures concomitantly, means for projecting light through the apertures to print images from one film upon the other film, and means for controlling the relative hues of the light projected through the respective apertures, thereby to control the relative contrast gradients of the printed complemental images.

26. In cinematographic apparatus for producing complemental images corresponding to certain color aspects of an object field by simultaneously passing beams of light through complemental images corresponding to such color aspects of the object field, the method of controlling the intensity and relative color values of the images thus produced comprising conjointly varying the intensity of the beams of light through the respective images, thereby to control the intensity of the images, and varying the intensity of the beams of light with respect to each other, thereby to control the relative color values of the respective complemental images.

27. In cinematographic apparatus for producing complemental images corresponding to certain color aspects of an object field by simultaneously passing beams of light through complemental images corresponding to such color aspects of the object field, the method of controlling the relative color values of the images comprising conjointly varying the relative intensity of the beams of light passing through the respective images.

28. In cinematographic apparatus for producing complemental images corresponding to certain color aspects of an object field by simultaneously passing beams of light through complemental images corresponding to such color aspects of the object field, the method of controlling the relative color values of the images comprising varying the relative intensity of the beams of light passing through the respective images.

Signed by me at Jacksonville, Florida, this thirty-first day of January, 1917.

WILLIAM BURTON WESTCOTT.

Witnesses:
 JESSIE C. BROWN,
 GEO. D. CARLTON.